United States Patent
Iapicco

Patent Number: 5,185,840
Date of Patent: Feb. 9, 1993

[54] BRANCHING METHOD FOR A MULTI-FIBER FIBEROPTIC CABLE

[75] Inventor: Roger Iapicco, Little Ferry, N.J.

[73] Assignee: Computer Crafts, Inc., Hawthorne, N.J.

[21] Appl. No.: 696,238

[22] Filed: May 6, 1991

[51] Int. Cl.$^5$ .............................................. G02B 6/44
[52] U.S. Cl. ..................................... 385/100; 385/102
[58] Field of Search ................. 350/96.2, 96.21, 96.23, 350/96.1, 320

[56] References Cited

U.S. PATENT DOCUMENTS

| | | | |
|---|---|---|---|
| 3,467,561 | 9/1969 | Waride | 156/49 |
| 4,580,874 | 4/1986 | Winter et al. | 350/96.21 |
| 4,699,462 | 10/1987 | Jones | 350/96.23 |
| 4,730,890 | 3/1988 | Kashimura et al. | 350/96.2 |
| 4,738,504 | 4/1988 | Jones | 350/96.20 |
| 4,738,505 | 4/1988 | Jones | 350/96.20 |
| 4,755,241 | 7/1988 | Steinberg | 156/48 |
| 4,799,760 | 1/1989 | Beatty et al. | 350/96.23 |
| 4,846,545 | 7/1989 | Estabrook et al. | 350/96.21 |
| 4,976,508 | 12/1990 | Okura et al. | 350/96.23 |
| 4,989,945 | 2/1991 | Ohkura | 350/96.20 |
| 5,009,474 | 4/1991 | Wurmser et al. | 350/96.2 |

*Primary Examiner*—Frank Gonzalez
*Assistant Examiner*—John Ngo
*Attorney, Agent, or Firm*—Eugene G. Reynolds

[57] ABSTRACT

A branching method for multi-fiber fiberoptic cables which comprises stripping off the jacket of a multi-fiber cable at the branching point, stripping the kevlar from the cable slightly beyond the branching point, folding back the kevlar over the jacket and holding the kevlar in place with heat shrink tubing leaving a portion of kevlar exposed about the end of the jacket with the individual buffered fibers extending beyond that point. Thereafter, a section of high grade heat resistant teflon tubing is slid onto each buffered fiber until a portion of the section of teflon tubing extends into the interior of said cable. Thereafter, a sheathing is prepared for each individual buffered fiber. The jacket of each sheathing is stripped slightly beyond its end point, the kevlar is folded back over the jacket and the kevlar is held in place with heat shrink tubing leaving a portion of kevlar exposed about the end of the jacket. A prepared sheathing is then slid onto each individual buffered fiber until a portion of the section of teflon tubing extends into the interior of said sheathing. Thereafter, the entire cable and sheath assembly about the branching point is placed in an injection mold cavity and a PVC mold is formed about the branching point. Each of the exposed portions of kevlar adheres to the PVC mold, thereby maintaining the integrity of the strength member. The sections of high grade heat resistant teflon tubing protect the buffered fibers from the stresses of the injection mold, thereby maintaining the integrity and freedom of the fibers.

25 Claims, 4 Drawing Sheets

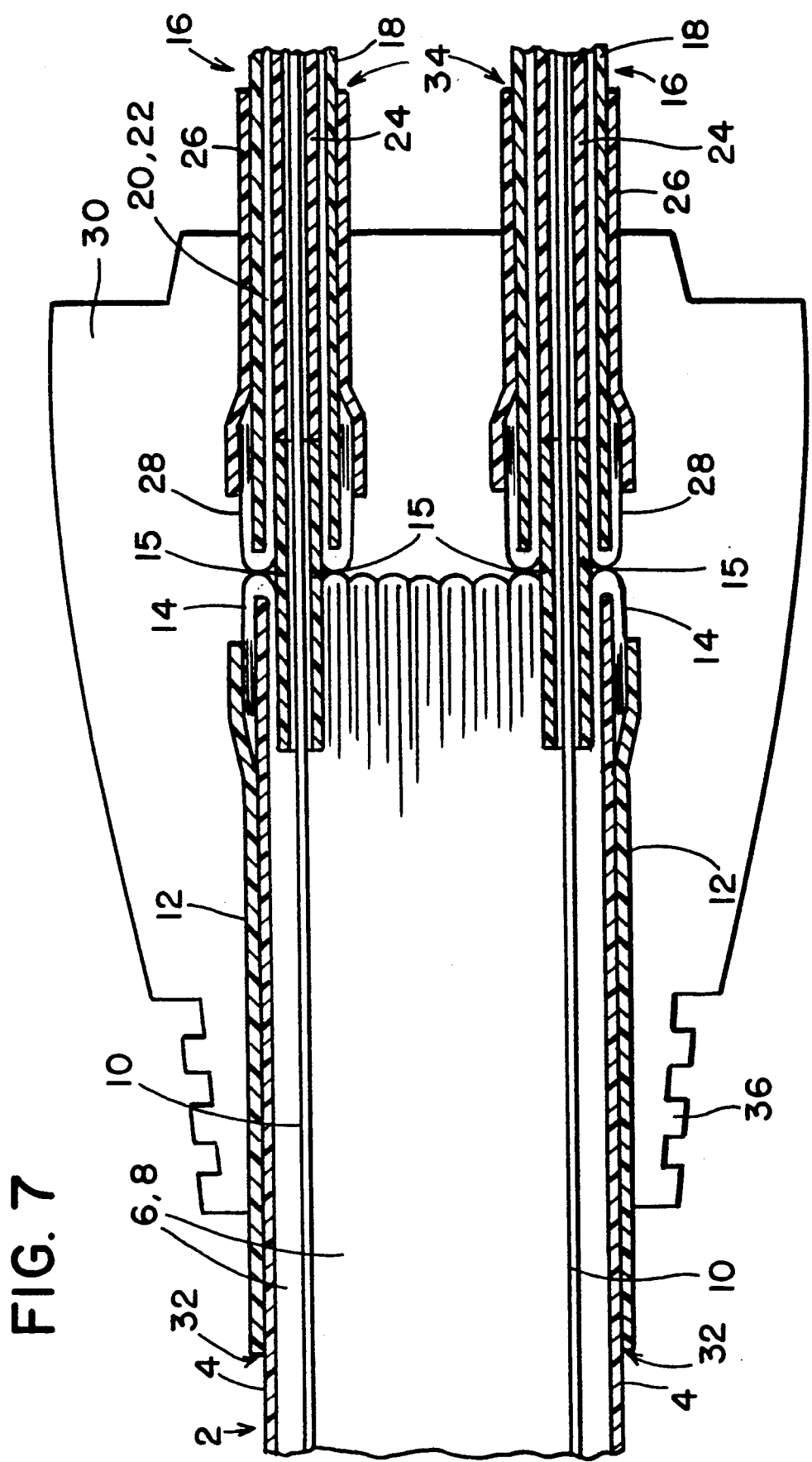

BRANCHING METHOD FOR A MULTI-FIBER FIBEROPTIC CABLE

BACKGROUND OF THE INVENTION

1. Field of the Invention

This invention relates in general to a branching method for splitting off individual buffered fibers from a multifiber fiberoptic cable and more particularly to a branching method utilizing an injection mold wherein the buffered fibers are not subject to stress during or after the injection molding process and wherein the integrity of the strength member of the cable system is maintained throughout its length and, in particular, throughout the branching point.

2. Description of the Prior Art

Fiberoptic cables are quickly displacing copper wiring as the medium of choice in local area network systems. The fiber environment, however, raises certain unique problems resulting from the delicate nature of fibers. For example, fiberoptic systems are extremely susceptible to signal loss or distortion, and even permanent damage to the fiber, when excessive bending of the fiber occurs or when forces such as pulling or crushing are exerted on the fiber.

These problems have been addressed by the placement of fibers within a cable comprised of an outer jacket, which in turn surrounds a strength member comprised of aramid fibers, such as kevlar, which in turn surrounds one or more buffered fibers. This cable system allows stress from pulling and crushing to be absorbed by the outer jacket and strength member. In addition, these components provide a certain degree of rigidity to the cable, thereby protecting against extreme bending. Even with these features, however, fiberoptic cables must still be handled with care.

Multi-fiber fiberoptic cables, i.e., fiberoptic cables with two or more buffered fibers, are generally used in network systems. As a result, it often becomes necessary to branch off an individual buffered fiber from the multi-fiber fiberoptic cable. This branching off, however, may result in a weak point in the system. In particular, the branching point may be highly susceptible to bending or other stresses. Furthermore, the integrity of the strength member may be compromised or even eliminated at the branching point.

These problems are well known and a number of prior art methods and devices have been used to attempt to resolve these problems. Each of these methods or devices, however, has disadvantages and fails to protect the integrity of the strength member and/or the fiber itself.

For example, one method that is used is to branch off the individual fibers and provide each individual fiber with its own covering of kevlar and a jacket. Thereafter, the kevlar coverings of the multi-fiber cable and the individual fibers are tied together and then this junction point is bound by heat shrink tubing. This method fails to maintain the continuous stress relief of the kevlar and, more importantly, the junction point is susceptible to bending or shifting, which can easily damage the fibers.

Another prior art device secures the opposing kevlar sections with ferrules which are in turn secured within a hollow plastic mold. This device depends on the strength of the plastic mold to maintain the continuous stress relief of the kevlar, is costly to produce and is labor intensive. More importantly, between the opposing ferrules there is a portion of exposed fiber. While this exposed fiber is enclosed within the hollow plastic mold, it is susceptible to being completely ruined if the hollow mold is crushed.

Another prior art device is disclosed in U.S. Pat. No. 4,976,508 wherein the use of a housing and potted resin is suggested. This device has numerous drawbacks, including optical loss resulting from the lack of stability of the fiber in the hollow housing or the force exerted on the fiber if resin is poured into the hollow housing.

These problems are recognized in a related patent, U.S. Pat. No. 4,989,945. Even the attempt to rectify these problems, as disclosed in this second patent, also falls short of the mark. In particular, among its disadvantages, the device disclosed in this second patent still has a portion of exposed fiber that is subject to stress when resin is introduced into the device.

Those prior art devices that disclose the use of resin as a means for securing the strength member disclose the use of a potted resin. A much quicker and cleaner molding process is injection molding. The use of injection molding with respect to fiberoptic branching applications has been limited, however, inasmuch as the injection molding process may exert a substantial amount of stress on those elements within the interior of the mold.

SUMMARY OF THE INVENTION

It is therefore an object of the present invention to overcome the aforementioned disadvantages of prior art systems and provide a relatively quick and inexpensive method for branching off individual buffered fibers from multi-fiber fiberoptic cables utilizing injection molding wherein the integrity and freedom of the individual fibers and signal paths is maintained.

It is a further object of the present invention to provide a relatively quick and inexpensive method for branching off individual buffered fibers from multi-fiber fiberoptic cables utilizing injection molding wherein the integrity of the strength member is maintained throughout the system and, in particular, throughout the branching portion of the system.

These and other objects of the present invention are achieved in a branching method for multi-fiber fiberoptic cables which comprises stripping off the jacket of the multi-fiber cable at the branching point, stripping the kevlar from the cable slightly beyond the branching point, folding back the kevlar over the jacket and holding the kevlar in place with heat shrink tubing leaving a portion of kevlar exposed about the end of the jacket with the individual buffered fibers extending beyond that point. Thereafter, a section of high grade heat resistant teflon tubing is slid onto each buffered fiber until a first portion of the section of teflon tubing extends into the interior of said cable. Thereafter, a sheathing—comprised of a jacket, surrounding a strength member comprised of kevlar, surrounding a tube—is prepared for each individual buffered fiber. The jacket of each sheathing is stripped slightly beyond its end point, the kevlar is folded back over the jacket and the kevlar is held in place with heat shrink tubing leaving a portion of kevlar exposed about the end of the jacket. A prepared sheathing is then slid onto each individual buffered fiber until a second portion of the section of teflon tubing situated about the buffered fiber extends into the interior of said sheathing. Thereafter, the entire cable and sheath assembly about the branching point is placed in an injection mold cavity and a PVC mold is formed about the branching point. Each of the exposed portions of kevlar adheres to the PVC mold, thereby maintaining the integrity of the strength member. At the same time, the sections of high grade heat resistant teflon tubing protect the buffered fibers from the stresses of the injection mold, thereby maintaining the integrity and freedom of the fibers.

These and other novel features and advantages of the invention will be described in greater detail in the following detailed description.

BRIEF DESCRIPTION OF TUE DRAWINGS

In the drawings, wherein similar reference numerals denote similar elements throughout the several views thereof:

FIG. 7 is a cross-sectional view of the PVC mold about the branching point.

DETAILED DESCRIPTION OF THE INVENTION

This detailed description of the invention describes the present invention utilizing for illustration a multi-fiber fiberoptic cable containing two individual buffered fibers. This detailed description is not intended to limit the scope of the present invention, which may be utilized for branching multi-fiber fiberoptic cables containing any number of individual buffered fibers.

Figure 1:
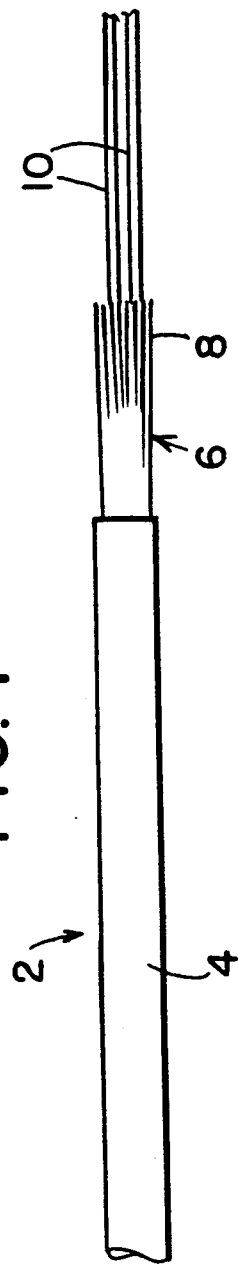
FIG. 1 is a view of a multi-fiber fiberoptic cable with its jacket and kevlar stripped off to allow for a branching off of individual fibers.
Figure 2:
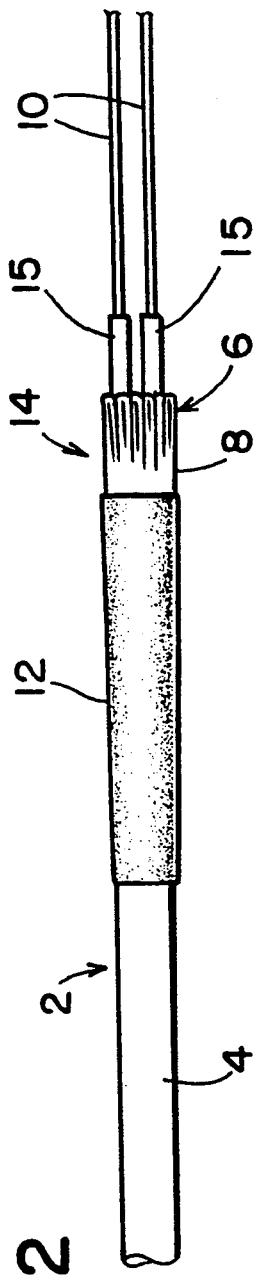
FIG. 2 is a view of a multi-fiber fiberoptic cable with its kevlar held in place by heat shrink tubing forming a kevlar bundle at the branching point and with a section of high grade heat resistant teflon tubing about each fiber extending partially into the interior of the cable.

Referring now to the drawings, and in particular to FIGS. 1 and 2, there is shown a multi-fiber fiberoptic cable 2 comprised of an outer jacket 4, which surrounds a strength member 6 comprised of aramid fibers such as kevlar 8. The strength member 6 in turn surrounds two buffered fibers 10.

The initial step of the present branching method is to prepare the cable 2 as shown in FIGS. 1 and 2. First, the jacket 4 is stripped off the cable 2 at the point along the cable 2 where an individual buffered fiber 10 is to be branched off. Approximately one half inch to one inch beyond the branching point the kevlar 8 is also stripped off leaving only the buffered fibers 10 extending beyond the end of the kevlar 8.

The kevlar 8 is then folded back over the jacket 4 of the cable 2. While no particular method need be used to accomplish this, it has been found that subjecting the end of the kevlar 8 to a puff of air generally provides an even disbursement of the kevlar 8 about the circumference of the jacket 4. After the kevlar 8 is folded back over the jacket 4 of the cable 2, it is secured in place by a piece of heat shrink tubing 12 leaving a portion of the kevlar 8 exposed about the end of the jacket 4. After this is done, a kevlar bundle 14 exists about the end of the cable 2 at the branching point. In the preferred embodiment of the present invention the kevlar bundle 14 is one quarter inch in length and the length of the heat shrink tubing 12 placed about the kevlar-covered cable 2 is one and one-half inches.

The next step of the present branching method is to place a section of high grade heat resistant teflon tubing 15 on each buffered fiber 10. As shown in FIG. 2, a section of teflon tubing 15 is slid onto each buffered fiber 10 until a first portion of the section of teflon tubing 15 extends into the interior of said cable 2. In the preferred embodiment of the present invention, the section of teflon tubing 15 is one inch in length and the first portion of the section of teflon tubing 15 that extends into the interior of said cable is one half inch in length. Furthermore, in the preferred embodiment of the present invention the high grade heat resistant teflon tubing 15 is Grade TFE ETW size 18 teflon tubing.

Figure 3:
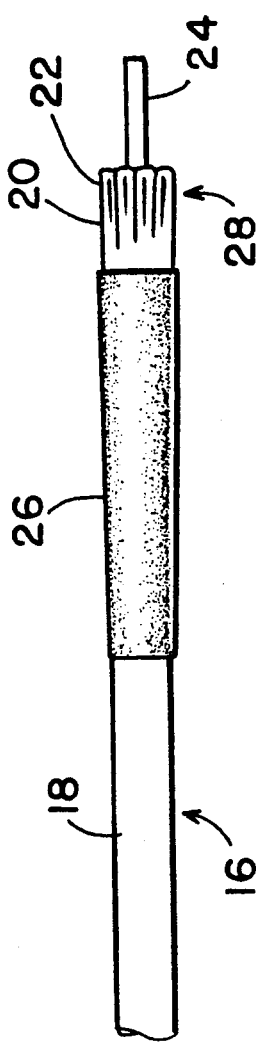
FIG. 3 is a view of sheathing which has been prepared for placement on an individual buffered fiber.

The next step in the present branching method is to prepare a sheathing 16 for each of the individual buffered fibers 10 branching from the cable 2. As shown in FIG. 3, each sheathing 16, which is a commercially available product, is comprised of a jacket 18, which surrounds a strength member 20 comprised of aramid fibers such as kevlar 22, which in turn surrounds a tube 24.

Each sheathing 16 is prepared by stripping approximately one half inch to one inch of the jacket 18 off the end of the sheathing 16. Thereafter the kevlar 22 left exposed after the removal of the jacket 18 is folded over the remaining jacket 18. Again, it has been found that one way to do so is to direct a puff of air at the kevlar 22. Once the kevlar 22 is folded over the jacket 18, it is secured in place by a piece of heat shrink tubing 26 leaving a portion of the kevlar 22 exposed about the end of the jacket 18. After this is done, a kevlar bundle 28 exists about the end of the sheathing 16. In the preferred embodiment of the present invention the kevlar bundle 28 is one quarter inch in length and the length of the heat shrink tubing 26 placed about each sheathing 16 is seven-eighth inch. When each sheathing is prepared as described above, the tube 24 of each sheathing extends beyond the end of the kevlar bundle 28. While this feature facilitates placement of a prepared sheathing 16 on a buffered fiber 10, it is not a necessary feature of the present invention and the end of said tube 24 may even be flush with the end of said kevlar bundle 28.

Figure 4:
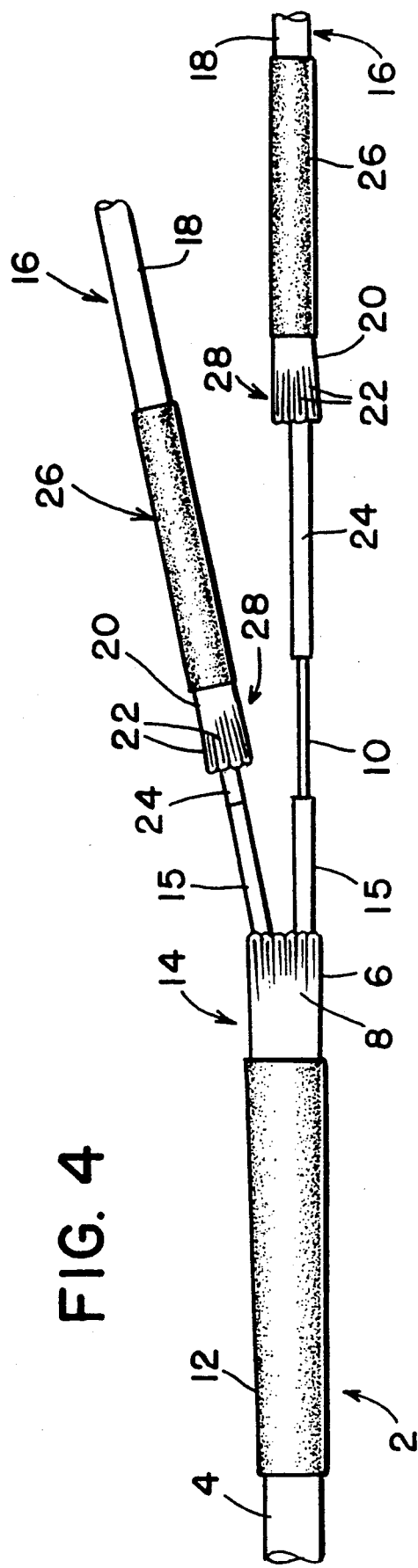
FIG. 4 is a view of sheathing being slid onto the individual buffered fibers.
Figure 5:
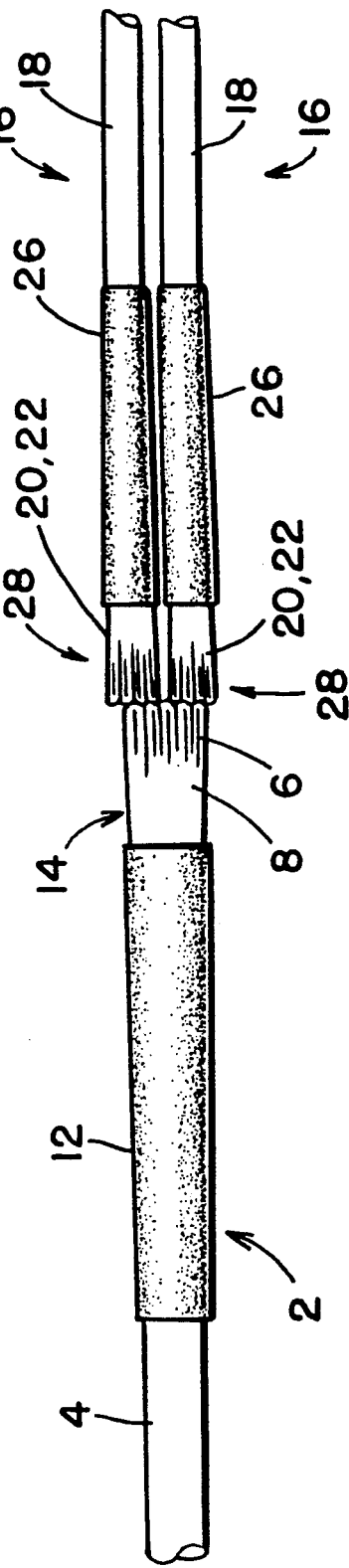
FIG. 5 is a view of the sheathing fully placed on the individual buffered fibers.

The next step of the present branching method is to place a prepared sheathing 16 on each buffered fiber 10. As shown in FIGS. 4 and 5, a sheathing 16 is slid onto each buffered fiber 10 until a second portion of the section of teflon tubing 15 situated about the buffered fiber 10 extends into the interior of said sheathing 16. A section of high grade heat resistant teflon tubing 15, therefore, surrounds each buffered fiber 10 through the branching point and protects each buffered fiber 10 from any bending stresses or stresses the injection molding process might impose at that point.

As each prepared sheathing 16 is slid onto a buffered fiber 10, the tube 24 of the sheathing 16 eventually abuts the section of teflon tubing 15 situated about the buffered fiber 10. As the sheathing 16 continues to be slid onto the buffered fiber 10, the tube 24 remains stationary relative to the section of teflon tubing 15 and, relative to the sheathing 16, moves into the interior of said sheathing 16 along with the second portion of the section of teflon tubing 15. The tube 24 remains stationary relative to the section of teflon tubing 15 rather than pushing the section of teflon tubing 15 further into the interior of the cable 2 because the friction force on the section of teflon tubing 15 within the cable 2 is greater than the friction force on the tube 24 within the sheathing 16.

Figure 6:
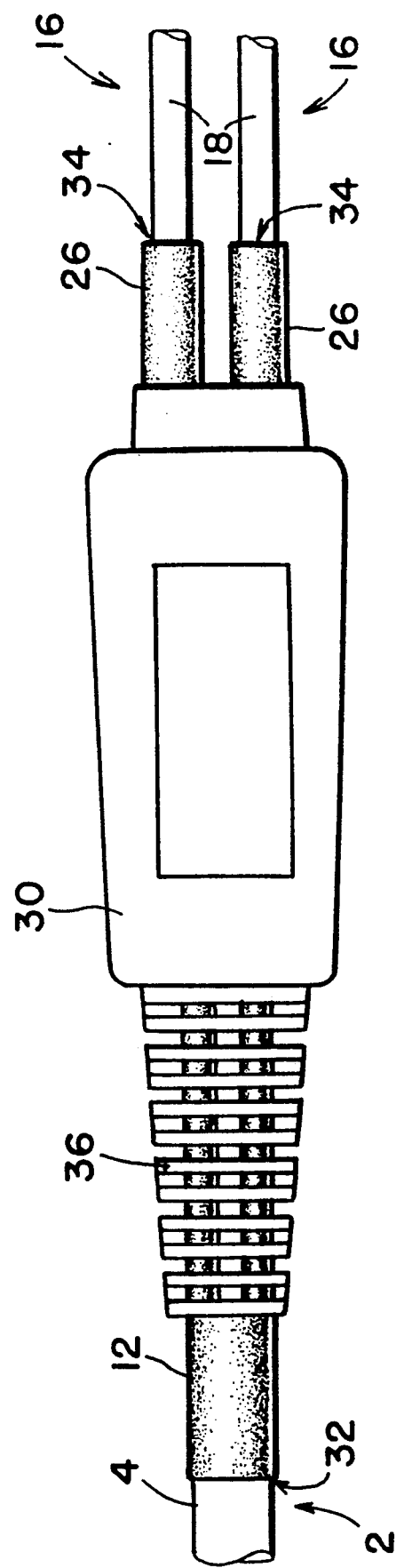
FIG. 6 is an overhead view of the PVC mold about the branching point.

As shown in FIGS. 6 and 7, the final step in the present branching method is the encapsulation of the branching point in a polyvinyl chloride (PVC) mold 30 by means of an injection molding process. The entire cable and sheath assembly about the branching point is placed in an injection mold cavity and the PVC material is injected into it. In the preferred embodiment of the present invention, the end of the PVC mold 30 does not extend beyond the outer edge 32 of the heat shrink tubing 12 on the cable 2 or the outer edge 34 of the heat shrink tubing 26 on the sheathing 16, thereby keeping the PVC mold 30 from melting and adhering to the jackets 4, 18. This feature maintains the aesthetic appearance of the device and avoids the chance of such melting and adhering causing a stress on the buffered fibers 10 due to a restriction on the jackets 4, 18. The higher temperature rating of the heat shrink tubing 12, 26, however, precludes the PVC mold 30 from adhering thereto. Rather, the PVC mold 30 is held in place about the heat shrink tubing 12, 26 by the compression/gripping action of the PVC mold 30 and the buffered fibers 10 are not affected. The PVC mold 30 itself need not be any particular shape. In the preferred embodiment of the invention, however, said PVC mold 30 is generally rectangular in shape which provides surface space on said mold 30 for labelling, as noted below.

The integrity of the strength members 6, 20 is maintained through the branching point as a result of the kevlar 8, 22 in the kevlar bundles 14, 28 being captured by the PVC mold 30 as the mold 30 hardens. Accordingly, the strength members 6, 20, in conjunction with the PVC mold 30, provide nearly the same strength protection as if a continuous strength member ran throughout the branching point.

The integrity and freedom of the buffered fibers 10, on the other hand, results from the use of the sections of high grade heat resistant teflon tubing 15. As previously noted, the sections of teflon tubing 15 extend beyond the branching point into the interior of the cable 2 and the interior of the sheathings 16. This feature permits the sections of teflon tubing 15 to provide the protection needed by the buffered fibers 10 from the stress of the injection molding process. The temperature rating of the sections of teflon tubing 15 precludes the PVC mold 30 from adhering to them and they are sufficiently rigid to preclude compression from the force of the PVC mold 30, thereby avoiding stress to the buffered fibers 10. The sections of teflon tubing 15 are held in place once the mold 30 is formed by the contact force of the PVC mold 30.

In the preferred embodiment of the invention, the injection molding process used utilizes a plain PVC with a durometer or hardness of Shore "A" 84. This preferred injection molding process utilizes a temperature of 320° F. and a pressure of 175 PSI.

As can be seen from the above, the present branching method provides substantial improvements over prior art devices and methods by encasing the buffered fibers 10 rather than utilizing a means that adheres to the buffered fibers 10.

Additional features may also be included in the present branching method. For example, in the preferred embodiment of the present invention, a strain relief member 36 may be included on the PVC mold 30. The strain relief member 36 helps protect against the buffered fibers 10 from being damaged by sharp bends in the cable at the edge of the mold 30. Furthermore, the use of an injection molding process allows labelling to be placed directly on the PVC mold 30 itself, thereby avoiding certain incidental costs associated with manufacturer's or technical labelling requirements. Finally, it should be noted that the present invention may also be utilized in connection with multimode cables, wherein a fiberoptic cable is included. An example of a multimode cable is a trimedia cable having coaxial, copper and fiberoptic cables therein.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A branching method for a multi-fiber fiberoptic cable, said cable comprised of an outer jacket surrounding a strength member of aramid fibers which in turn surrounds two or more buffered fibers, which comprises:
   (A) preparing the multi-fiber fiberoptic cable by
      (i) stripping off the cable jacket at a point along the cable,
      (ii) stripping off the strength member at a point beyond the point where the cable jacket is stripped off,
      (iii) folding the remaining strength member back over the cable jacket,
      (iv) securing the strength member in place about the cable jacket leaving a length of strength member fibers exposed about the end of the cable jacket,
   (B) sliding a section of teflon tubing onto each buffered fiber such that a first portion of the section of teflon tubing extends into the interior of the cable,
   (C) preparing a sheathing, said sheathing comprised of an outer jacket surrounding a strength member of aramid fibers which in turn surrounds a tube, for each buffered fiber by
      (i) stripping off the sheathing jacket at one end of the sheathing,
      (ii) folding the strength member back over the sheathing jacket,
      (iii) securing the strength member in place about the sheathing jacket leaving a length of strength member fibers exposed about the end of the sheathing jacket,
   (D) sliding a prepared sheathing onto each buffered fiber until a second portion of the section of teflon tubing extends into the interior of the sheathing, and
   (E) encapsulating the prepared cable and the prepared sheathing in a PVC mold by means of an injection molding process such that the exposed strength member fibers about the cable and the exposed strength member fibers about each sheathing are captured by the PVC mold as said mold hardens.

2. The branching method recited in claim wherein the strength members are secured about the cable jacket and the sheathing jackets by means of heat shrink tubing.

3. The branching method recited in claim 2 wherein the heat shrink tubing used to secure said strength member about the cable jacket is one and one-half inches in length.

4. The branching method recited in claim 2 wherein the heat shrink tubing used to secure said exposed strength member about each sheathing jacket is seven-eighths inch in length.

5. The branching method recited in claim 2 wherein the heat shrink tubing encapsulating said cable jacket and encapsulating each sheathing jacket extends beyond the end of said PVC mold.

6. The branching method recited in claim wherein the section of sheathing jacket stripped off the end of each sheathing is one half to one inch in length.

7. The branching method recited in claim 1 wherein the point at which said strength member is stripped off of said cable is one half inch to one inch beyond the point where said cable jacket is stripped off.

8. The branching method recited in claim 1 wherein the length of the exposed portion of strength member fibers about the end of the cable jacket and the length of the exposed portion of strength member fibers about the end of the sheathing jacket are each one quarter inch.

9. The branching method recited in claim 1 wherein the section of teflon tubing is a high grade heat resistant teflon tubing.

10. The branching method recited in claim 9 wherein the section of teflon tubing is Grade TFE ETW size 18 teflon tubing.

11. The branching method recited in claim 1 wherein the section of teflon tubing is one inch in length, the first portion of the section of teflon tubing that extends into the interior of the cable is one half inch in length, and the second portion of the section of teflon tubing that extends into the interior of the sheathing is one half inch in length.

12. The branching method recited in claim 1 wherein said aramid fibers are kevlar.

13. The branching method recited in claim 1 wherein said PVC mold is formed with a strain relief member.

14. The branching method recited in claim 1 wherein said PVC mold is formed with plain PVC having a durometer of Shore "A" 84.

15. The branching method recited in claim 1 wherein said injection molding process utilizes a temperature of 320° F. and a pressure of 175 PSI.

16. A branching method for a multi-fiber fiberoptic cable, said cable comprised of an outer jacket surrounding a strength member of aramid fibers of kevlar which in turn surrounds two or more buffered fibers, which comprises:
(A) preparing the multi-fiber fiberoptic cable by
(i) stripping off the cable jacket at a point along the cable,
(ii) stripping off the kevlar at a point beyond the point where the cable jacket is stripped off,
(iii) folding the remaining kevlar back over the cable jacket,
(iv) securing the kevlar in place about the cable jacket with a length of heat shrink tubing leaving a length of kevlar exposed about the end of the cable jacket,
(B) sliding a one inch long section of high grade heat resistant teflon tubing onto each buffered fiber such that a first portion of the section of teflon tubing extends into the interior of the cable a distance of one half inch,
(C) preparing a sheathing, said sheathing comprised of an outer jacket surrounding a strength member of aramid fibers of kevlar which in turn surrounds a tube, for each buffered fiber by
(i) stripping off the sheathing jacket at one end of the sheathing,
(ii) folding the kevlar back over the sheathing jacket,
(iii) securing the kevlar in place about the sheathing jacket with a length of heat shrink tubing leaving a length of kevlar exposed about the end of the sheathing jacket,
(D) inserting a prepared sheathing onto each buffered fiber until a second portion of the section of teflon tubing extends into the interior of the sheathing a distance of one half inch, and
(E) encapsulating the prepared cable and prepared sheathing in a PVC mold by means of an injection molding process such that the exposed kevlar about the cable and the exposed kevlar about each sheathing are captured by the PVC mold as said mold hardens, and such that the longitudinal edges of said mold do not extend beyond the edges of the heat shrink tubing encapsulating the cable and each sheathing.

17. The branching method recited in claim 16 wherein the heat shrink tubing used to secure the kevlar about the cable jacket is one and one-half inches in length.

18. The branching method recited in claim 16 wherein the heat used to secure the kevlar about each sheathing jacket shrink tubing used to secure the kevlar about each sheathing jacket is seven-eighths inch in length.

19. The branching method recited in claim 16 wherein the section of sheathing jacket stripped off is one-half to one inch in length.

20. The branching method recited in claim 16 wherein the point at which said kevlar is stripped off of said cable is one-half inch to one inch beyond the point where said cable jacket is stripped off.

21. The branching method recited in claim 16 wherein the length of the exposed portion of kevlar about the end of the cable jacket and the length of the exposed portion of kevlar about the end of the sheathing jacket are each one quarter inch.

22. The branching method recited in claim 16 wherein the section of teflon tubing is Grade TFE ETW size 18 teflon tubing.

23. The branching method recited in claim 16 wherein said PVC mold is formed with a strain relief member.

24. The branching method recited in claim 16 wherein said PVC mold is formed with plain PVC having a durometer of Shore "A" 84.

25. The branching method recited in claim 16 wherein said injection molding process utilizes a temperature of 320° F. and a pressure of 175 PSI.

* * * * *